United States Patent [19]

Kurgan

[11] Patent Number: 5,325,429
[45] Date of Patent: Jun. 28, 1994

[54] APPARATUS FOR ACCEPTING AND RETAINING AN INFORMATION CARD

[75] Inventor: Jeffery F. Kurgan, Hoffman Estates, Ill.

[73] Assignee: Motorola, Inc., Schaumburg, Ill.

[21] Appl. No.: 894,873

[22] Filed: Jun. 8, 1992

[51] Int. Cl.[5] .................... H04M 1/00; G06K 7/06; G06K 13/06
[52] U.S. Cl. .................... 379/429; 235/441; 235/483
[58] Field of Search .............. 379/58, 429; 235/475, 235/476, 477, 478, 479, 480, 481, 482, 483, 492, 441, 486

[56] References Cited

U.S. PATENT DOCUMENTS

| | | |
|---|---|---|
| 4,236,667 | 12/1980 | Crowley et al. ............ 235/482 |
| 4,899,035 | 2/1990 | Goldmann et al. .......... 235/441 |
| 4,926,032 | 5/1990 | Shimamura et al. ......... 235/486 |
| 5,012,078 | 4/1991 | Pemet . |
| 5,055,970 | 10/1991 | Wehs . |

FOREIGN PATENT DOCUMENTS

| | | |
|---|---|---|
| 0214478A2 | 3/1987 | European Pat. Off. . |
| 0254316 | 1/1988 | European Pat. Off. . |
| 0282296A2 | 9/1988 | European Pat. Off. . |
| 0338900A1 | 4/1989 | European Pat. Off. . |
| 0316700A1 | 5/1989 | European Pat. Off. . |
| 0351103A3 | 6/1989 | European Pat. Off. . |
| 0476892A1 | 9/1991 | European Pat. Off. . |
| 0480334A1 | 10/1991 | European Pat. Off. . |
| 2587549 | 12/1987 | France . |
| 2220777A | 1/1990 | United Kingdom . |

OTHER PUBLICATIONS

ITT ElectroMechanical Components Worldwide. Brochure containing their range of Smart Card Connectors. This brochure describes the available range of smart card connectors from ITT.
Amphenol Industrial Technology Division. Brochure containing various chip card readers.
Amphenol Industrial Technology Division. Catalogue containing Amphenol's range of chip card readers.

Primary Examiner—James L. Dwyer
Assistant Examiner—Jack Chiang
Attorney, Agent, or Firm—Daniel W. Juffernbruch; Kirk W. Dailey

[57] ABSTRACT

The present patent application discusses a low profile information card chamber (107) used in a radiotelephone (101). The information card chamber accepts, retains and makes electrical contact to an information card (105). The information card chamber (107) makes electrical contact to the information card when the information card is properly inserted (105). The electrical contacts are located on the lower platform (213) of the information card chamber (107). Upon inserting the information card (105) into the information card chamber (107), the information card (105) is translated away from the electrical contacts (205). Prior to being fully inserted, the information card (105) is translated towards the electrical contacts (205). The two translational devices allow an information card (105) to be inserted into the information card chamber (107) without excessive wiping of the electrical contacts (205) by the information card (105).

15 Claims, 3 Drawing Sheets

APPARATUS FOR ACCEPTING AND RETAINING AN INFORMATION CARD

FIELD OF THE INVENTION

Generally, this invention relates to information card chambers also known as smart card readers and more specifically, a low profile information card chamber having a simplified landing contact configuration.

BACKGROUND OF THE INVENTION

Typically, the type of apparatus described herein are referred to as card readers and are used in applications such as telephone billing, banking, cinema and mass transportation applications. Recently, the information card chambers are used to allow writing of information to the information cards. The information cards may contain integrated circuits, microprocessors, or memory.

One application of these information card chambers is in the radiotelephone market. Information card chambers are used to read radiotelephone subscriber identification information from an information card typically in the European market. As radiotelephones become smaller and portable a need arises for a low profile integral information card chamber which can make electrical contact to read and write information to and from information cards.

Previously, radiotelephones have included integrated information card chambers using a wiping contact configuration for the low profile characteristics. In a wiping contact configuration, the information card is inserted directly on top of the electrical contacts of the information card chamber, causing the front of the information card to wipe the electrical contacts. Upon full insertion of the information card, the contacts of the information card rest on the contacts of the information card chamber. On contacts having a gold plating resulting from an electro-electroless plating process, after 10 to 12,000 cycles the gold plating of the wiping contact will be removed, making contact between the information card chamber and the information card unreliable. There is a need for an alternative low profile information card chamber which will be reliable beyond 15,000 cycles up to 100,000 cycles.

SUMMARY OF THE INVENTION

The present invention encompasses an information card chamber. The information card chamber accepts, retains and makes electrical contact to an information card. The information card chamber makes electrical contact to the information card when the information card is properly inserted. The electrical contacts are located on the lower platform of the information card chamber. Upon inserting the information card into the information card chamber, the information card is translated away from the electrical contacts. Prior to being fully inserted, the information card is translated towards the electrical contacts. The two translational devices allow an information card to be inserted into the information card chamber without excessive wiping of the electrical contacts by the information card.

DESCRIPTION OF A PREFERRED EMBODIMENT

The preferred embodiment encompasses an information card chamber within a portable radiotelephone. The information card chamber has a low profile and utilizes three translational devices, either inclined planes or cantilevered springs. The translational devices create a landing contact configuration in a printed circuit board based product with minimal volume and weight. In the past, only wiping contacts were used in such a small area. Thus, the number of cycles is improved beyond 15,000 and up to 100,000 cycles in a low profile integrable information card chamber.

Figure 1:
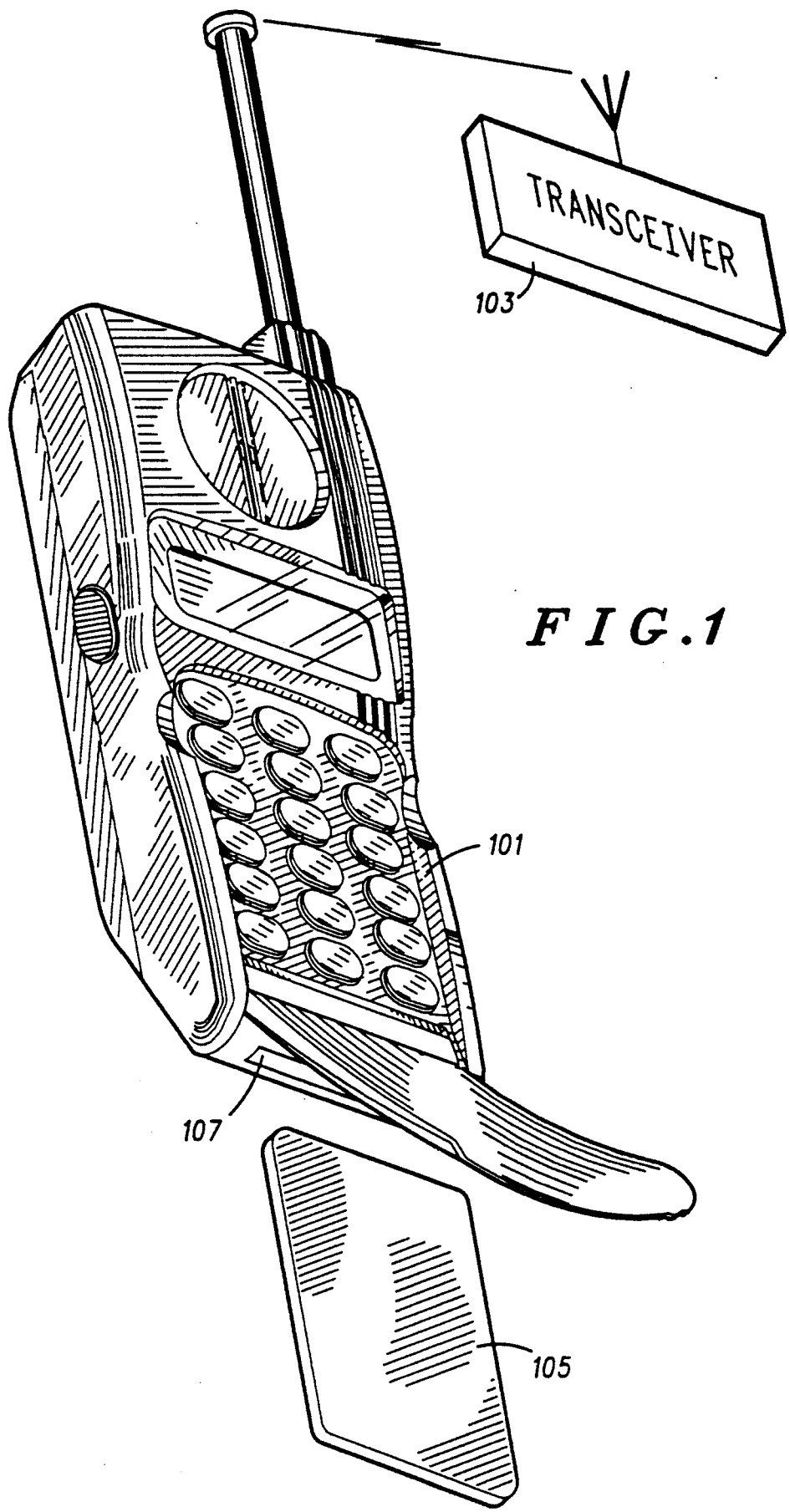
FIG. 1 is a block diagram of a radiotelephone system employing the present invention.

FIG. 1 is a block diagram of a radiotelephone communications system in accordance with the present invention. The fixed site transceiver 103 transmits and receives radio frequency (RF) signals to and from mobile and portable radiotelephones located within a fixed geographic service area. Radiotelephone 101 is one of the portable radiotelephones served by the fixed site transceiver 103. The RF signals transmitted from the portable radiotelephone 101 and the fixed site transceiver 103 include data or voice signals, subscriber identification, and billing information. The subscriber identification and billing information is stored in a memory contained on an information card 105. The information card 105 also known as a smart card can be a full size or a chip size smart card. The billing information contained with the information card 105 is read by a microprocessor via the information card chamber 107 contained within the radiotelephone 101. Detailed description and illustration of the information card chamber follows.

Figure 2A:
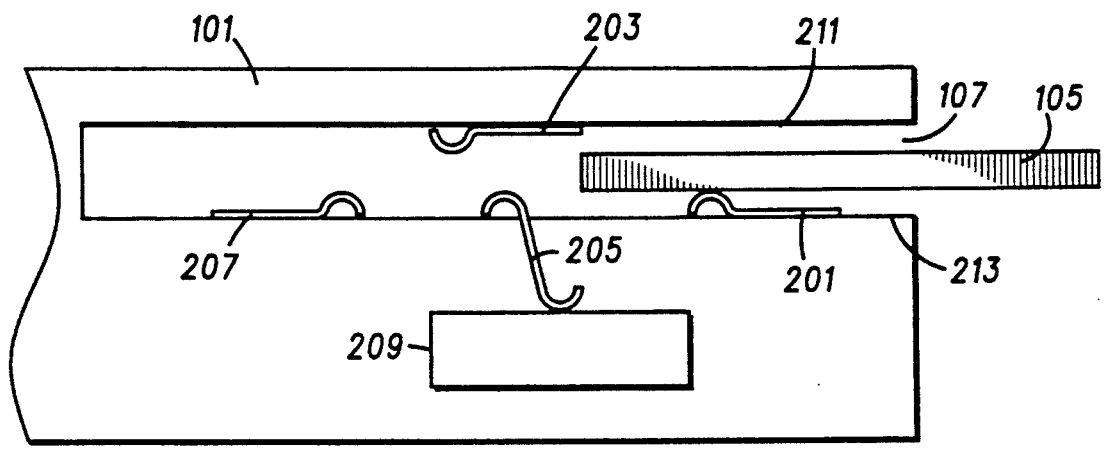
FIGS. 2A-C are an illustration of the radiotelephone including an information card chamber in accordance with the present invention.
Figure 2B:
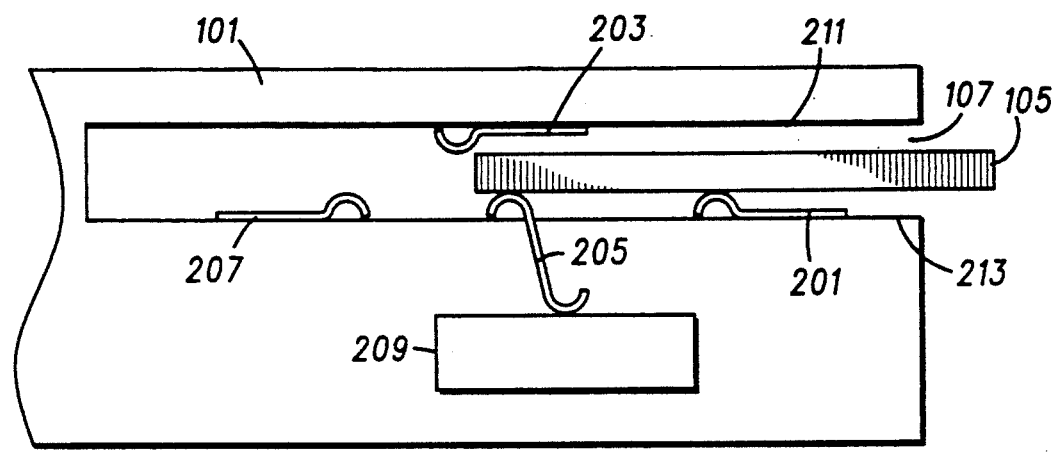
Figure 2C:
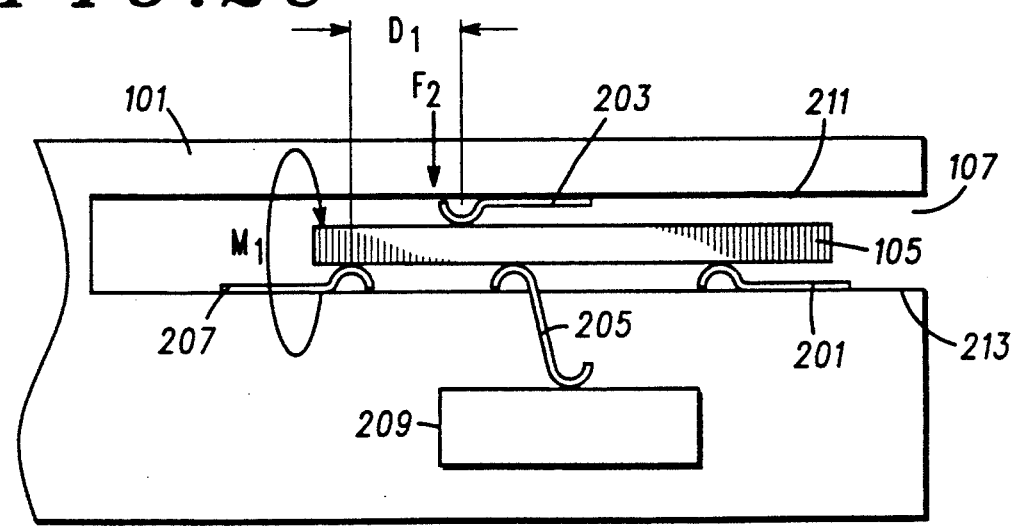

FIGS. 2A-C are illustrating the insertion of the information card 105 into the information card chamber 107 contained within the radiotelephone 101 as illustrated in FIG. 1. The information card chamber 107 has at least two platforms 211, 213 containing the translational devices and electrical contacts. In addition to these two platforms, 211, 213, a third platform may be located opposite the entrance to the information card chamber 107, however, the third platform is not necessary to the invention disclosed herein and it is not illustrated. In the preferred embodiment cantilevered springs were chosen for the translational devices. However, other translational devices including inclined planes and torsional springs may be used in a similar fashion and would still be considered to be within the scope of the invention disclosed herein.

In FIG. 2A, the information card 105 has approached the first cantilevered spring 201 and has subsequently translated away from the electrical contacts 205. FIG. 2B illustrates inserting the information card 105 further into the information card chamber 107. The information card 105 is translated by the first cantilevered spring 201, clearing the set of electrical contacts 205, thus, avoiding wiping the information card 105 on the electrical contacts 205.

FIG. 2C illustrates the position of the information card 105 in the information card chamber 107 when the information card 105 is properly inserted. Here, the card has reached second cantilevered spring 203. The second cantilevered spring translates the information card 105 towards a set of electrical contacts 205 such that the information card 105 essentially lands on top of the electrical contact 205 with only a short wiping required to maintain a cleaning function to remove any oxidation on either the set of contacts 205 or the contacts on the information card 105.

The spring constant of the second cantilevered spring ($k_2$) is greater than the spring constant of the first cantilevered spring ($k_1$), such that the second cantilevered spring 203 overcomes the translation of the first cantilevered spring 201. This difference in spring constants allows proper contact and pressure between the contacts of the information card 105 and the set of electrical contacts 205 as required by GSM specification 11.11.

The set of electrical contacts 205 are illustrated in FIGS. 2A-C as only one electrical contact however different configurations are possible. The set of electrical contacts 205 could be two rows of contacts or multiple contacts on the width. A third cantilevered spring 207 is optional and is used to translate the first end of the information card 105 removing any moment created by the second cantilevered spring 203 and the set of electrical contacts 205. In the preferred embodiment, the spring constant K of the third cantilevered spring 207 would be less than that of the second cantilevered spring 203. The third cantilevered spring 207 becomes pertinent to the design when the embodiment includes two rows of electrical contacts and a pliable information card 105. Then, the third cantilevered spring 207 allows proper electrical contact between the electrical contacts of the information card to both rows of the electrical contacts of the information card chamber. As illustrated in FIGS. 2A-C the forces $F_1$ and $F_2$ acting through distance D1 achieve a moment $M_1$ on the information card 105 great enough to insure electrical contact between all of the electrical contacts of the information card and the electrical contacts of the information card chamber. Otherwise, the moment or the arc in the information card 105 may cause only one row of the electrical contacts to be properly connected.

When the information card 105 is properly inserted as illustrated in FIG. 2C, the electrical contacts of the information card 105 rest with the appropriate amount of pressure on the set of electrical contacts 205. This electrical connection couples the main microprocessor 209 to the information card 105 allowing data to be written to or read from the information card 105 by the microprocessor 209. In the preferred embodiment, the information card 105 contains read only memory and the information is only read from the information card 105 by the main microprocessor 209. However, another equally sufficient embodiment information card 105 may contain microprocessors, integrated circuits and read and write memory such that it may perform many more functions. Thus, the connections made to the information card may be read, and write and power connections, etc.

Figure 3A:
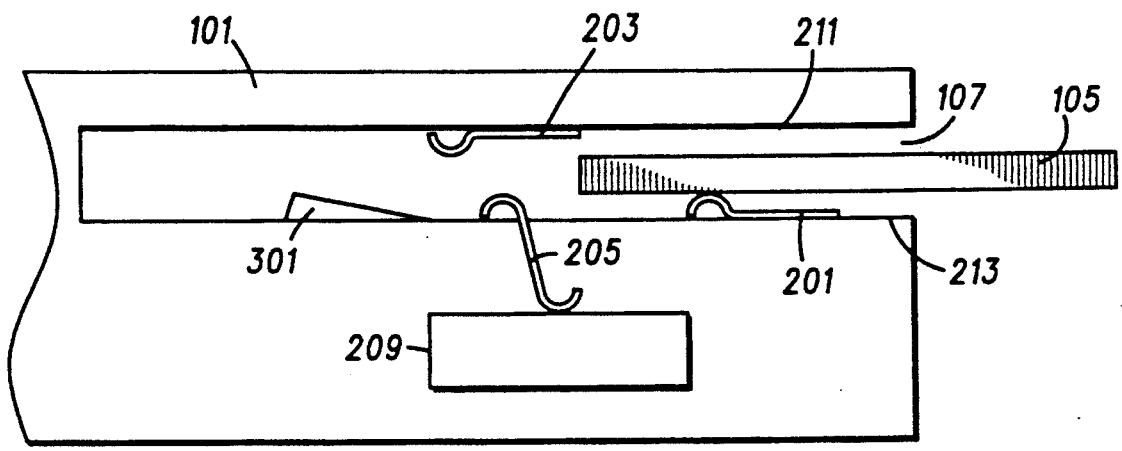
FIGS. 3A-C are a radiotelephone including an alternative embodiment of an information card chamber in accordance with the present invention.
Figure 3B:
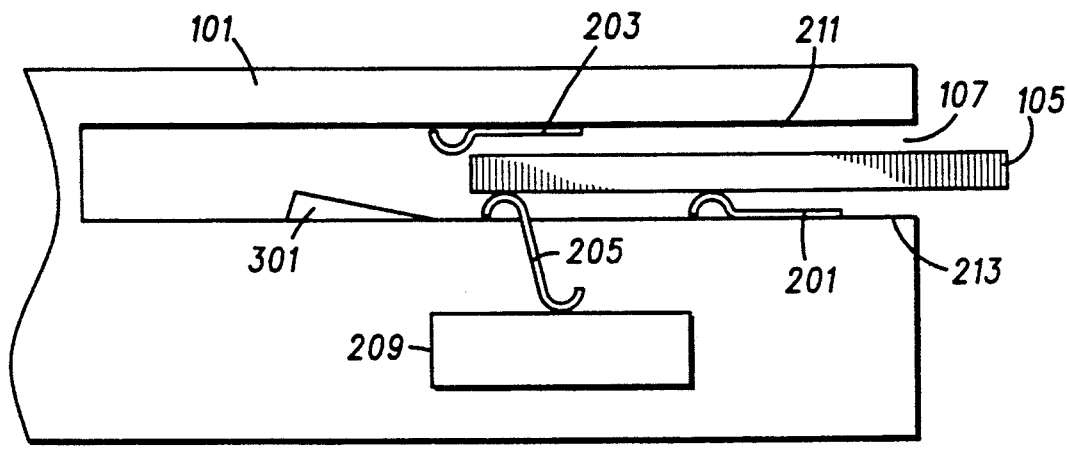
Figure 3C:
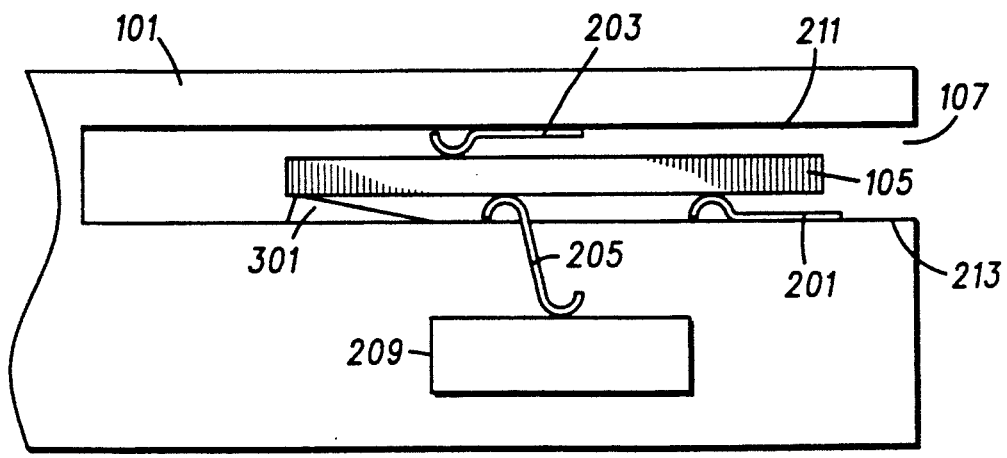

FIGS. 3A-C illustrate an alternative embodiment of an information card chamber 107 contained within a radiotelephone 101. Here, the insertion of the information card 105 into the information card chamber 107 is identical to that illustrated and described in FIGS. 2A-C and the preceding text. The only difference is the implementation of an inclined plane 301 instead of the third cantilevered spring 207 as described in the preceding paragraph. Here, the inclined plane provides the same function as the third cantilevered spring 207, translating the first inserted end of the information card 105 away from the set of electrical contacts 205, removing the moment on the information card 105 created by the second cantilevered spring 203 and the set of electrical contacts 205.

What is claimed is:

1. An information card chamber for accepting, retaining and making electrical contact to an information card, the information card chamber having at least a first and a second platform, the first platform raised from the plane of and substantially parallel to the second platform, the information card chamber comprising:

means for making electrical contact to the information card when the information card is properly inserted, said means for making electrical contact disposed only on a first side of the first platform;

first means for translating the information card away from said means for making electrical contact while said information card is inserted, said first means disposed only on said first side of the first platform; and second means for translating the information card towards said means for making electrical contact while said information card is inserted, said second means fixedly disposed only on a first side of the second platform.

2. An information card chamber in accordance with claim 1 further comprising third means for translating a first end of the information card away from said means for making electrical contact, such that the information card makes proper contact to said means for making electrical contact when the information card is properly inserted.

3. An information card chamber for accepting, retaining and making electrical contact to an information card, the information card chamber having at least a first and a second platform, the first platform raised from the plane of and substantially parallel to the second platform, the information card chamber comprising:

a first set of electrical contacts including at least one electrical contact, said first set of electrical contacts partially exposed on a first side of the first platform, such that said first set of electrical contacts makes electrical contact to the information card when the information card is properly inserted;

a first cantilevered spring coupled to said first side of the first platform, translating said information card away from said first set of electrical contacts, said first cantilevered spring having a first predetermined spring constant ($k_1$); and a second cantilevered spring coupled to a first side of the second platform, translating said information card towards said first set of electrical contacts, said second cantilevered spring having a second predetermined spring constant ($k_2$).

4. An information card chamber in accordance with claim 3 wherein said second predetermined spring constant ($k_2$) is greater than said first predetermined spring constant ($k_1$).

5. An information card chamber in accordance with claim 3 wherein the information card chamber further comprises a third cantilevered spring disposed on said first side of the first platform, translating a first end of said information card such that every electrical contact of said first set of electrical contacts makes electrical contact to the information card when the information card is properly inserted.

6. An information card chamber in accordance with claim 5 wherein said third cantilevered spring has a third predetermined spring constant ($k_3$) and said third predetermined spring constant ($k_3$) is less than said second predetermined spring constant ($k_2$).

7. An information card chamber in accordance with claim 3 wherein said information card chamber further comprises a first inclined plane coupled said first side of the first platform, translating a first end of said information card such that every electrical contact of said first set of electrical contacts makes electrical contact to the information card when the information card is properly inserted.

8. A radiotelephone including a microprocessor and an information card chamber disposed within a radiotelephone housing, the information card chamber for accepting, retaining and making electrical contact to an information card, the radiotelephone comprising:
   a first set of electrical contacts, each contact having a first and a second end, said first end of each contact coupled to the microprocessor disposed within the radiotelephone housing, said second end of each contact exposed within the information card chamber, such that said first set of electrical contacts makes electrical contact to the information card when the information card is properly inserted;
   first means for translating the information card away from said first set of electrical contacts while said information card is inserted; and
   second means for translating the information card towards said first set of electrical contacts while said information card is inserted, said second means fixedly disposed within the information card chamber.

9. A radiotelephone in accordance with claim 8 further comprising third means for translating a first end of the information card away from said means for making electrical contact, such that the information card makes proper contact to said means for making electrical contact when the information card is properly inserted.

10. A radiotelephone in accordance with claim 8 wherein the information card chamber comprises at least a first and a second platform, said second platform raised from and substantially parallel to said first platform.

11. A radiotelephone in accordance with claim 10 wherein said first means for translating further comprises a first cantilevered spring coupled to a first side of the first platform, translating said information card away from said first set of electrical contacts, said first cantilevered spring having a first predetermined spring constant ($k_1$).

12. A radiotelephone in accordance with claim 11 wherein said second means for translating further comprises a second cantilevered spring coupled to a first side of the second platform, translating said information card towards said first set of electrical contacts, said second cantilevered spring having a second predetermined spring constant ($k_2$).

13. A radiotelephone in accordance with claim 12 wherein said second predetermined spring constant ($k_2$) is greater than said first predetermined spring constant ($k_1$).

14. A radiotelephone in accordance with claim 13 further comprising a third cantilevered spring disposed on a first side of the first platform, translating a first end of said information card such that every electrical contact of said first set of electrical contacts makes electrical contact to the information card when the information card is properly inserted.

15. A radiotelephone in accordance with claim 14 wherein said third cantilevered spring has a third predetermined spring constant ($k_3$) and said third predetermined spring constant ($k_3$) is less than said second predetermined spring constant ($k_2$).

* * * * *